March 6, 1951 M. MALLORY 2,544,606
ENGINE AND AUXILIARY FLUID POWER SYSTEM FOR VEHICLES
Filed May 13, 1948
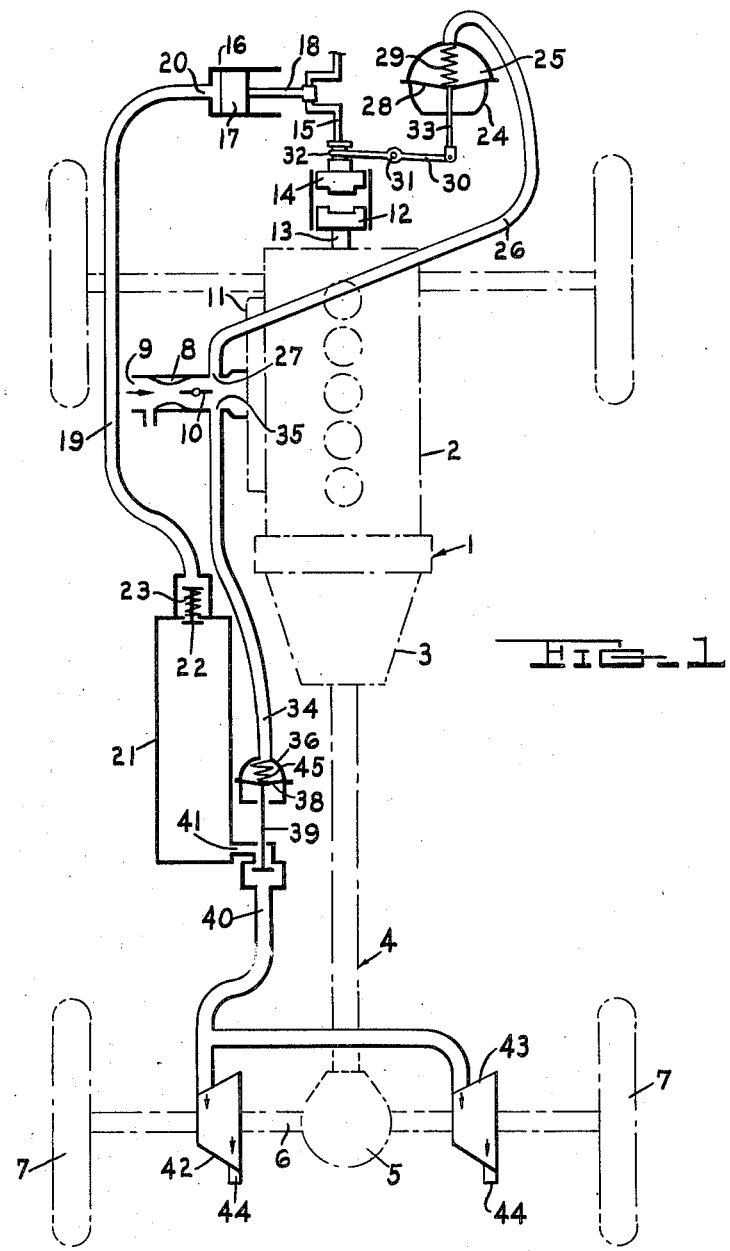
INVENTOR.
MARION MALLORY
BY
Barnes, Kisselle, Laughlin & Raisch
ATTORNEYS Patented Mar. 6, 1951

2,544,606

UNITED STATES PATENT OFFICE 2,544,606

ENGINE AND AUXILIARY FLUID POWER SYSTEM FOR VEHICLES

Marion Mallory, Detroit, Mich.

Application May 13, 1948, Serial No. 26,830

5 Claims. (Cl. 180—54)

This invention relates to an automotive vehicle.

In the normal operation of an automotive vehicle considerable energy is wasted each time the vehicle is decelerated, whether the deceleration is partial or completely brings the vehicle to a stop.

This invention contemplates a mechanism for storing up and utilizing the energy normally wasted in the deceleration of an automotive vehicle.

It is an object of this invention to store up the energy dissipated in decelerating an automotive vehicle and then release this energy to assist in the acceleration of the vehicle.

In the drawings:

Fig. 1 is a diagrammatic showing of an automotive vehicle provided with my mechanism for storing up the energy normally dissipated in the deceleration of the vehicle and for releasing and utilizing this energy in the acceleration of the vehicle.

Referring more particularly to the drawings, I have shown an automotive vehicle generally designated 1. The vehicle is propelled by a conventional internal combustion engine 2 through a transmission 3, propeller shaft 4, differential 5, rear axle 6, and rear wheels 7.

The engine carburetor is generally designated 8 and has an air inlet end 9, a conventional throttle valve 10 and is connected to the intake manifold 11.

The parts forming my improvement are as follows: driving clutch plate 12 fixed on a projection 13 of the main engine crankshaft, driven clutch plate 14 splined on compressor shaft 15, conventional reciprocating piston type compressor 16 having piston 17, connecting rod 18 between piston 17 and crankshaft 15, conduit 19 connecting outlet port 20 of compressor 16 with pressure tank 21, check valve 22 normally biased closed by compression spring 23, suction device 24 having a suction chamber 25 connected by conduit 26 with orifice 27 in the intake passageway between manifold 11 and throttle 10, flexible diaphragm 28 forming one of the walls of suction chamber 25, compression spring 29, lever 30 fulcrumed at 31 having a forked end 32 engaging shiftable clutch plate 14, connecting rod 33 between lever 30 and diaphragm 28, conduit or pipe line 34 connecting orifice 35 in the intake passageway between throttle 10 and manifold 11 with suction device 36, flexible diaphragm 38 connected to valve 39 in conduit 40 between the outlet 41 of pressure tank 21 and air turbines 42 and 43, the rotors of each of which are connected to the rear axle shafts 6. Each turbine is provided with an outlet 44.

The operation of my device is as follows: As shown, throttle 10 is wide open and the engine is driving the vehicle. At this time the vacuum at orifice 35 and 27 is low. Consequently, clutch 12, 14 is disengaged and valve 39 is open so that compressed air from tank 21 is released through line 40 to turbines 42 and 43, thereby assisting in the propulsion of the vehicle. When the vehicle is decelerated, throttle valve 10 will be closed thereby creating a high vacuum at orifices 27 and 35 which vacuum is established in suction chamber 25 and in suction device 36. Consequently flexible diaphragm 28 acts through lever 30 to engage clutch member 14 with clutch member 12. This causes rotation of crankshaft 15 and sets air compressor 16 in operation. Compressor 16 now acts as a brake on the vehicle and the compressed air is forced through line 15 by check valve 22 into storage tank 21. At the same time the high vacuum in suction device 36 acts through diaphragm 38 to hold valve 39 closed so that compressed air cannot escape from line 21 through line 40 to turbines 42 and 43. Compressor 16, while in operation, acts, of course, through crankshaft 15, clutch 12, 14, engine 2, transmission 3, propeller shaft 4, differential 5, rear axle 6 and wheels 7 to brake or decelerate the vehicle. As a matter of fact, during deceleration wheels 7 act through axle 6, differential 5, propeller shaft 4, transmission 3, engine crankshaft 13 and clutch 12, 14 to drive compressor 16. This energy which would ordinarily be wasted in decelerating my vehicle is stored up in tank 21 in the form of compressed air. When throttle 10 is opened to accelerate the vehicle, the pressure at orifices 27 and 35 rises and therefore the pressure in suction devices 25 and 36 also rises, thereby permitting spring 29 to disengage clutch 12, 14, thereby stopping compressor 16 and simultaneously spring 45 opens valve 39 thereby permitting the compressed air in pressure tank 21 to escape through line 40 and act through turbines 42 and 43 to drive rear wheels 7 and assist in the acceleration of the vehicle.

From the above it is evident that I have herein disclosed a braking and accelerating mechanism for an automotive vehicle which is essentially characterized in that the energy normally dissipated largely in the form of heat by braking the vehicle to decelerate the same is stored in the form of latent energy which is utilized for accelerating the vehicle—the mechanism being controlled pneumatically by the pressures obtaining in the intake passageway on the engine side of the throttle valve.

I do not wish to be limited to the types of valves or clutches used, neither do I wish to be limited to the use of turbines on rear axles. I can use a piston type air motor instead of a turbine type. Further, both the air pump and the air motor could be installed on the rear axle.

The invention mainly lies in the method of storing up energy on deceleration and utilizing stored up energy for acceleration. The results can be accomplished in many different forms and would still be in the scope of the invention.

I claim:

1. In an automotive vehicle comprising an internal combustion engine for propelling the same, an intake passageway through which motive fluid is supplied to said engine, a throttle valve controlling the flow of motive fluid through said intake passageway, a fluid compressor, driving connections including a clutch between said compressor and said engine, a storage reservoir connected to the outlet of said compressor for storing compressed fluid, a fluid pressure actuated motor arranged to assist said engine in driving said vehicle, a passageway connecting said fluid motor with said reservoir, a valve controlling flow of fluid under pressure through said passageway, a suction device connected to said valve, a passageway connecting said suction device with the intake passageway on the engine side of said throttle valve, a second suction device operatively connected to said clutch, a passageway connecting said second suction device with the intake passageway on the engine side of said throttle valve, said suction devices responding to a rise in intake passageway pressure such as occurs when the throttle valve is opened to accelerate the engine whereby the first suction device opens said valve to admit fluid under pressure from said reservoir to said fluid motor and the fluid motor assists in driving the vehicle and simultaneously the second suction device disengages said clutch to thereby render the compressor inoperative, said suction devices responding to a fall in intake passageway pressure such as occurs when the throttle is moved to idle position to decelerate the engine whereby the first suction device closes the valve between the reservoir and the fluid motor and the second suction device engages said clutch whereby the engine as it decelerates drives said compressor which in turn compresses fluid into said storage reservoir.

2. The combination claimed in claim 1 wherein each of said suction devices comprises a flexible diaphragm and a spring, the spring in the first of said suction devices normally biasing said valve toward open position and the spring in the second of said suction devices normally biasing said clutch to disengaged position.

3. The combination claimed in claim 2 wherein the driving member of said clutch is mounted upon the crankshaft of the engine.

4. The combination claimed in claim 1 wherein the automotive vehicle is a wheeled vehicle, driving connections between the engine and at least one of said wheels and driving connections between at least one of said wheels and said fluid motor whereby the fluid motor assists in the acceleration of said vehicle and the compressor acts as a brake to assist in deceleration of the vehicle.

5. In an automotive vehicle comprising an internal combustion engine for propelling the same, an intake passageway through which motive fluid is supplied to said engine, a throttle valve controlling the flow of motive fluid through said intake passageway, mechanism adapted for actuation by the inertia of the vehicle upon deceleration for decelerating the vehicle and simultaneously storing energy, and suction mechanism actuated by the pressure in the intake passageway on the engine side of the throttle valve for rendering the aforesaid mechanism effective to decelerate the vehicle and store up energy when the throttle valve is moved toward idle position and for rendering the aforesaid mechanism effective to accelerate the vehicle when the throttle valve is moved toward open position, the said first mentioned mechanism consisting of a device for converting kinetic energy into potential energy and a second device for storing said potential energy, and the above-said suction mechanism comprising a pair of servo-motors actuated by intake passageway pressure so that when the throttle valve is in idle position the one servo-motor renders the energy converting mechanism effective to decelerate the vehicle and the other servo-motor renders the energy storing mechanism effective to store the potential energy generated by the aforesaid energy converting mechanism and when the throttle valve is moved to open position the first servo-motor responds to intake passageway pressure to disconnect the energy converting mechanism from the engine and the second servo-motor responds to release the potential energy in the potential energy storing mechanism, and mechanism actuated by the released potential energy to thereby assist the engine in propelling the vehicle.

MARION MALLORY.

REFERENCES CITED

The following references are of record in the file of this patent:

UNITED STATES PATENTS

| Number | Name | Date |
| --- | --- | --- |
| 976,226 | Stevenson | Nov. 22, 1910 |
| 1,138,667 | Kitchen | May 11, 1915 |
| 1,337,501 | Arluskes | Apr. 20, 1920 |
| 1,645,178 | Hall-Brown | Oct. 11, 1927 |
| 2,199,090 | Palmer | Apr. 30, 1940 |
| 2,256,302 | Wehmeier | Sept. 16, 1941 |